United States Patent
Colby et al.

(10) Patent No.: US 8,661,019 B2
(45) Date of Patent: Feb. 25, 2014

(54) JOIN ALGORITHMS OVER FULL TEXT INDEXES

(75) Inventors: Latha Sankar Colby, Sunnyvale, CA (US); Quanzhong Li, San Jose, CA (US); Fatma Ozcan, San Jose, CA (US); Mir Hamid Pirahesh, San Jose, CA (US); Eugene J. Shekita, San Jose, CA (US); Zografoula Vagena, London (GB)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 12/696,013

(22) Filed: Jan. 28, 2010

(65) Prior Publication Data

US 2011/0184933 A1 Jul. 28, 2011

(51) Int. Cl.
*G06F 7/00* (2006.01)
*G06F 17/30* (2006.01)

(52) U.S. Cl.
USPC .......................................... 707/714; 707/715

(58) Field of Classification Search
None
See application file for complete search history.

(56) References Cited

U.S. PATENT DOCUMENTS

| | | | |
|---|---|---|---|
| 5,809,502 A | 9/1998 | Burrows | |
| 6,067,543 A | 5/2000 | Burrows | |
| 7,685,138 B2 * | 3/2010 | Beyer et al. | 707/715 |
| 7,945,578 B2 * | 5/2011 | Leung et al. | 707/769 |
| 2010/0299367 A1 * | 11/2010 | Chakrabarti et al. | 707/803 |

OTHER PUBLICATIONS

Whang et al., "Odysseus: A High-Performance ORDBMS Tightly-Coupled with IR Features", Proceedings of the 21st International Conference on Data Engineering, pp. 1104-1105, 2005, IEEE.*

Guo et al., "XRANK: Ranked Keyword Search over XML Documents," Proceedings of the Int'l Conf. on Management of Data, ACM SIGMOD, pp. 16-27, 2003.*

Halverson et al., "Mixed Mode XML Query Processing," Proceedings of the 29th Int'l Conf. on Very Large Data Bases, pp. 225-236, ACM, 2003.*

Carmel et al., "Searching XML documents via XML fragments", Proceedings of the 26th annual international ACM SIGIR conference on Research and development in informaion retrieval, pp. 151-158, 2003, ACM.*

Chakrabarti et al., "Compressed data structures for annotated web search", Proceedings of the 21st international conference on World Wide Web , pp. 121-130, 2012, ACM.*

Szydelski, Jakub "Combining Relational and Full-Text Search on Various Data Sources Under Retention of Their Original Access Rights," Aug. 16, 2002. http://wwwbruegge.in.tum.de/publications/da/szydelski2002.pdf.

(Continued)

*Primary Examiner* — Michael Hicks
(74) *Attorney, Agent, or Firm* — Cantor Colburn LLP; Yusuke Kanehira

(57) ABSTRACT

According to one embodiment of the present invention, a method for processing join predicates in full-text indexes is provided. The method includes evaluating local predicates of an outer full text index to generate a first posting list of documents. For each document in the first posting list, the value of a join attribute is determined and an inner full text index is probed to obtain a second posting list of documents containing one of the join attributes determined for each document. Local predicates of an inner full text index are evaluated to generate a third posting list of documents, and the second posting list is merged with the third posting list to generate a merge list of documents. Documents in the first posting list may be paired up with documents in the merge list.

6 Claims, 8 Drawing Sheets

(56) References Cited

OTHER PUBLICATIONS

R. Baeza-Yates and G. Navaro. Integrating contents and structure in text retrieval. ACM SIGMOD Record, 25(1):67-79, 1996.

H. Meuss and C. Stronhmaier. Improving Index Structures for Structured Document Retrieval. In Proc. of Annual Colloquium on IR Research, Feb. 1999.

"Indexing and Querying XML Data for Regular Path Expressions", Q. Li et al, VLDB 2001.

"Holistic Twig Join: Optimal XML Pattern Matching", N. Bruno et al, SIGMOD 2002.

"Holistic Twig Joins on Indexed XML Documents", H. Jiang et al, VLDB 2003. pp. 273-284.

"Efficient Processing of XML Twig Queries with OR-Predicates", H. Jiang et al, SIGMOD 2004.

"Virtual Cursors for XML Joins", B. Yang et al, CIKM 2004.

"Efficient Object Oriented Twig Query Evaluation over XML and Semantically Annotated Documents", S. Grennan et al, IBM paper, submitted (copy available).

Inverted Index Support for Parametric Search, M. Fontoura et al, Internet Mathematics, 3(2), 153-185, 2006, also IBM RJ10329 2004.

K. Beyer et al. System RX: One Part Relational, One Part XML. In Proc. of SIGMOD, Baltimore, Maryland, Jun. 2005.

J.-M. Bremer and M. Gertz. Integrating Document and Data Retrieval Based on XML. VLDB Journal, 15(1):53-83, 2006.

S. Cohen, J. Mamou, Y. Kanza, and Y. Sagiv. XSEarch: A Semantic Search Engine for XML. In Proc. of VLDB, pp. 45-56, Berlin, Germany, 2003.

E. Curtmola, S. Amer-Yahia, P. Brown, and M. Fernandez. GalaTex: A Conformant Implementation of the XQuery FullText Language. In Proc. of XIME-P, 2005.

D. Florescu, D. Kossmann, and I. Manolescu. Integrating keyword search into XML query processing. Computer Networks, 33(1-6):119-135, 2000.

M. Fontoura, V. Josifovski, E. Shekita, and B. Yang. Optimizing Cursor Movement in Holistic Twig Joins. In Proc. of CIKM, pp. 784-791, 2005.

L. Guo, F. Shao, C. Botev, and J. Shanmugasundaram. XRANK: Ranked Keyword Search over XML Documents. In Proc. of SIGMOD, pp. 16-27, San Diego, California, 2003.

R. Kaushik, P. Bohannon, J. F. Naughton, and H. F. Korth. Covering indexes for branching path queries. In SIGMOD Conference, pp. 133-144, 2002.

R. Kaushik, R. Krishnamurthy, J. F. Naughton, and R. Ramakrishnan. On the integration of structure indexes and inverted lists. In SIGMOD '04, pp. 779-790, New York, NY, USA, 2004.

Y. Mass et al. JuruXML—an XML Retrieval System. In Proc. of INEX, pp. 73-80, 2002.

T. Milo and D. Suciu. Index Structures for Path Expressions. In ICDT, pp. 277-295, 1999.

S. Pal et al. XQuery Implementation in a Relational Database System. In Proc. of VLDB, Aug. 2005.

A. Theobald and G. Weikum. The Index-based XXL Search Engine for Querying XML data with Relevance Ranking. In Proc. of EDBT, pp. 477-495, Prague, Czech Republic, 2002.

M. Theobald, R. Schenkel, and G. Weikum. An e±cient and versatile query engine for TopX search. In VLDB '05, pp. 625-636, 2005.

F. Weigel, H. Meuss, F. Bry, and K. U. Schulz. Content-Aware Dataguides: Interleaving IR and DB Indexing Techniques for EfficientRetrieval of Textual XML Data. In Proc. of European Conference of Information Retrieval, Apr. 2004.

World Wide Web Consortium. XQuery 1.0 and XPath 2.0 Full-Text, Nov. 2005. W3C Working Draft, see http://www.w3.org/TR/xquery-full-text/.

Lucene Search Engine. http://lucene.apache.org/.

P. Mishra et al., "Join Processing in Relational Databases", ACM Comput. Surv., 24(1):63-113, 1992.

J. Zobel et al., "Inverted files for Text Search Engines", ACM Comput. Surv., 38(2):6, 2006.

* cited by examiner

| Full-Text Nested-Loop Join |
|---|

1: {Input: *outer* - outer full-text index}
2: {       *inner* - inner full-text index}
3: {       *outerlp* - outer local predicates}
4: {       *innerlp* - inner local predicates}
5: {       *outerja* - outer join attribute}
6: {       *innerja* - inner join attribute}
7: {Output: $\{(d_i, d_j)\}$ - matching doc id pairs}
8:
9: *result* := { }
10: $dids_o$ := *FT_Search(outer,outerlp)*
11: for $(d_o \in dids_o)$ do
12:   $v_o$ := *FT_GetAttribute(outer,outerja, $d_o$)*
13:   $dids_i$ := *FT_Search(inner,innerja = $v_o$ ∧ innerlp)*
14:   for $(d_i \in dids_i)$ do
15:     *result* := *result* ∪ $\{(d_o, d_i)\}$
16:   end for
17: end for
18: return *result*

FIG.1

Full-Text Dictionary Join (FTDJ)

1: {Input: *outer* - outer full-text index}
2: { *inner* - inner full-text index}
3: { *outerlp* - outer local predicates}
4: { *innerlp* - inner local predicates}
5: { *outerja* - outer join attribute}
6: { *innerja* - inner join attribute}
7: {Output: $\{(d_i, d_j)\}$ - matching doc id pairs}
8:
9: *result* := { }
10: *term_pairs* := *FT_DI(outer, outerja, inner, innerja)*
11: for $((term_1, term_2) \in term\_pairs)$ do
12:   $dids_1$ := *FT_Search(outer, $term_1 \wedge outerlp$)*
13:   $dids_2$ := *FT_Search(inner, $term_2 \wedge innerlp$)*
14:   *result* := *result* $\cup (dids_1 \times dids_2)$
15: end for
16: return *result*

FIG.3

FT_DI Full-Text Dictionary Intersection

1: {Input: *outer* - outer full-text index}
2: { *outerja* - outer join attribute}
3: { *inner* - inner full-text index}
4: { *innerja* - inner join attribute}
5: {Output: {($term_i$, $term_j$)} - set of matching term pairs}
6:
7: *result* := { }
8: $terms_1$ := *FT_Terms(outer,outerja)*
9: $terms_2$ := *FT_Terms(inner,innerja)*
10: /* merge join dictionary terms */
11: while ($terms_1$.*hasNext*() && $terms_2$.*hasNext*()) do
12:   if ($term_i$.*value* < $term_j$.*value*, $i, j = 1, 2, i <> j$) then
13:     $term_i$ := $terms_i$.*next*()
14:     continue
15:   end if
16:   *result* := *result* ∪ {($term_1$, $term_2$)}
17: end while
18: return *result*

FIG.4

| Full-Text Dictionary Join Alternative (FTDJA) |
|---|
| 1: {Input: *outer* - outer full-text index} |
| 2: { *inner* - inner full-text index} |
| 3: { *outerlp* - outer local predicates} |
| 4: { *innerlp* - inner local predicates} |
| 5: { *outerja* - outer join attribute} |
| 6: { *innerja* - inner join attribute} |
| 7: {Output: $\{(d_i, d_j)\}$ - matching doc id pairs} |
| 8: |
| 9: *result* := FTDJ(*outer, inner,* ∅,∅, *outerja, innerja*); |
| 10: Sort *result* by the outer doc id. |
| 11: *result* := FT_Search(*outer, result* ∧ *outerlp*); |
| 12: Sort *result* by the inner doc id. |
| 13: *result* := FT_Search(*inner, result* ∧ *innerlp*); |
| 14: return *result* |

FIG.6

| Full-Text Merge Join |
|---|
| 1: {Input: *outer* - outer full-text index} |
| 2: { *inner* - inner full-text index} |
| 3: { *outerlp* - outer local predicate} |
| 4: { *innerlp* - inner local predicate} |
| 5: { *outerja* - outer join attribute} |
| 6: { *innerja* - inner join attribute} |
| 7: {Output: $\{(d_i, d_j)\}$ - matching doc id pairs} |
| 8: |
| 9: *result* := {} |
| 10: $result_1$ := *FT_AttrSearch*(*outer, outerlp, outerja*) |
| 11: $result_2$ := *FT_AttrSearch*(*inner, innerlp, innerja*) |
| 12: *result* := *MergeJoin*($result_1$, $result_2$) |
| 13: return *result* |

FIG.7

JOIN ALGORITHMS OVER FULL TEXT INDEXES

BACKGROUND

The present invention relates to information retrieval, and more specifically, to the efficient access of full text indexes.

There has been a rapid increase in the volume of information available on the Internet and other sources. One widely used method for users to search and access this information is known as full text search, in which a search engine examines all of the words in every stored document as it tries to match search words supplied by the user. Full text search is usually divided into two tasks: indexing and searching. The indexing stage will scan the text of all the documents and build a list of search terms, called a full text index. In the search stage, only the full text index is referenced rather than the text of the original documents.

Traditional structured databases store more and more semi-structured and unstructured textual information, which requires the full-text search to be integrated. Consequently, full-text indexes and their efficient access methods are critical in modern information retrieval. Full-text indexes have been augmented to support requirements beyond simple keyword search. More and more querying features on structured data are supported by full-text indexes directly. For example, advanced features like fielded search, numeric search, and XML support have been proposed and implemented inside full-text search.

A join is an operation that combines records from two tables in a relational database. A join can be used to combine fields from tables using values common to each. With the support of searching structured data in full-text indexes, similar join operations are also useful in full-text searches.

SUMMARY

According to one embodiment of the present invention, a method comprises: evaluating local predicates of an outer full text index to generate a first posting list of documents; determining the value of a join attribute for each document in the first posting list; probing an inner full text index to obtain a second posting list of documents containing one of the join attributes determined for each document; evaluating local predicates of an inner full text index to generate a third posting list of documents; merging the second posting list with the third posting list to generate a merge list of documents; and pairing up each document in the first posting list with documents in the merge list.

According to another embodiment of the present invention, a method comprises: performing a merge join of terms from dictionaries of inner and outer full text indexes to generate a list of matching term pairs; evaluating an outer local predicate of a query in the outer full text index to generate a first posting list; evaluating an inner local predicate of a query in the inner full-text index to generate a second posting list; for each matching term pair, probing to obtain a third posting list from the outer full-text index, and to obtain a fourth posting list from the inner full-text index; merging the first and third posting lists to generate a fifth posting list; merging the second and fourth posting lists to generate a sixth posting list; and pairing documents in the resulting fifth and sixth posting lists.

According to another embodiment of the present invention, a computer program product for processing join predicates in full-text indexes comprises: a computer usable medium having computer usable program code embodied therewith, the computer usable program code comprising: computer usable program code configured to: perform a merge join of terms from dictionaries of inner and outer full text indexes to generate a list of matching term pairs; evaluate an outer local predicate of a query in the outer full-text index to generate a first posting list with join values; evaluate an inner local predicate of the query in the inner full-text index to generate a second posting list with join values; and evaluate a join predicate on the first and second posting list.

BRIEF DESCRIPTION OF THE SEVERAL VIEWS OF THE DRAWINGS

FIG. 1 shows pseudo code for a full text nested loop join process in accordance with an embodiment of the invention;

FIG. 3 shows pseudo code for a full text dictionary join process in accordance with an embodiment of the invention;

FIG. 4 shows the pseudo code for a full-text dictionary intersection step used with the full text dictionary join process shown in FIG. 3 in accordance with an embodiment of the invention;

FIG. 6 shows pseudo code for an alternative process for use with the full-text dictionary join processor shown in FIG. 5 in accordance with an embodiment of the invention;

FIG. 7 shows pseudo code for a full-text merge join process in accordance with an embodiment of the invention.

DETAILED DESCRIPTION

Figure 2:
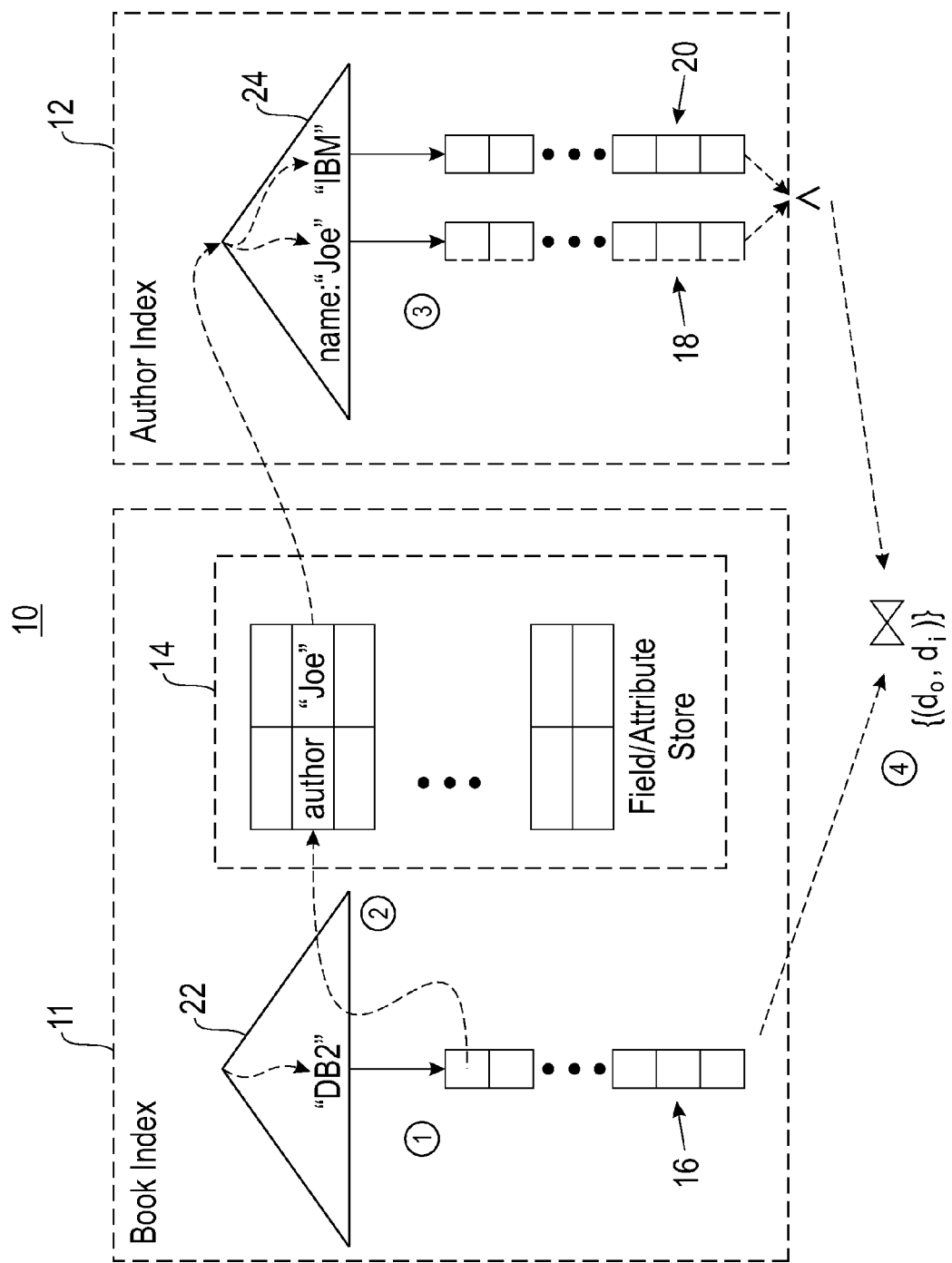
FIG. 2 shows a diagram of a full-text nested loop join processor in accordance with an embodiment of the invention.

Embodiments of the invention provide techniques for performing join operations over full-text indexes. The embodiments of the invention will be explained with reference to the following example search problem. Suppose that we have full-text indexes over a data set about books and authors, and we would like to issue the query, "find the books about DB2 and whose author is affiliated with IBM".

A full-text index is good at finding the documents (books) having keyword "DB2" or the documents (authors) having keyword "IBM". However, in order to evaluate the whole query, we need to join the books and authors together through author and name attributes of books and authors respectively. For traditional databases, normally, full-text indexes are integrated and used for full-text searches only. If the above join processing is supported by full-text indexes, we can exploit this capability by pushing down join predicates in a database to full-text indexes, which is able to combine the join processing with full-text searches. In this way, we can reduce the processing cost inside a database and reduce the communication cost between the database and the full-text index search, which is benefited from the direct accesses of full-text indexing structures and from the utilization of specialized full-text search processes.

Embodiments of the invention address the problem of how to efficiently support join operations within full-text index engines. These embodiments include three join processes over full-text indexes, namely full-text nested-loop join, full-text dictionary join, and full-text merge join.

Support of join processing on document attributes, such as author attribute of book documents and name attribute of author documents, is facilitated by an understanding of how attributes and their values are stored and indexed within a full-text index. The values of an attribute can be stored inside a full-text index without having to be indexed, if the attribute is only used for retrieval purposes. For example, the URLs of web pages are returned along with the search results for users to retrieve the original page, but they may not be indexed for keyword search. On the other hand, some attributes can be stored and indexed at the same time. As described below, there are a number of typical methods to store attribute values in a full-text index.

Some full-text indexes (e.g., Apache Lucene) provide a document/attribute/field store (or a similar mechanism), which can be used to store attribute-value pairs that can be retrieved using document ids efficiently. Each entry in the document store may contain several attribute-value pairs. After the document id list is generated from a search, a user can retrieve the stored attribute values of those identified documents using their ids. To locate a document and its attributes in a document store, it is common that the document id is used as the index of an array of in-memory document pointers. In this case, this lookup process is just one indirect pointer access and is hence an inexpensive operation.

A posting list of a full-text index contains document ids and positional information about a term/keyword. Some full-text indexes also support payloads which allow meta-data or user defined information to be stored inside posting lists. Payloads can be used to store additional information, such as formatting, grammar and linkage information for web pages, or XPath data. Payloads can also be used to store extra positional information for XML data. This payload information can be used to do additional filtering or to adjust term ranking. Document attributes can be stored in posting lists, where the attribute names are treated as terms in the term dictionary. For example, to store author attribute for the book collection, we index author as a term in the dictionary, and the author values are stored inside the author posting list. To fetch author values, we add author as an additional term to a query, and retrieve the author payload from posting list directly for qualifying document ids during query processing.

If multiple attributes are needed for a smaller number of documents, the document store would be preferred. Otherwise, payload would be a better choice, since it clusters attribute values together, and provides sequential scanning and possible skipping, in a similar way as other term posting lists.

The values of an attribute can also be indexed regardless of whether it is stored or not. Numeric and short string types of attributes (such as date, price, country and name) are typically indexed. To index attribute values, the attribute name and value are concatenated together to form an index term. For example, the composite term author:Joe represents author and its value Joe. In this way, search on attribute and value can be supported using the term dictionary directly. When the cardinality of an attribute value domain is large, e.g., numeric attributes like price, each such term may have only one document, which is inefficient for scanning large numbers of values. In this case, the posting lists of several values in a certain range may be grouped together into one posting list.

A first embodiment of the invention includes a process for performing a full-text nested-loop join (FTNJ). In a relational database, a nested-loop join reads the rows in the outer table, possibly with index access and the filtering of local predicates. Then each qualified row is joined with the rows from the inner table, preferably with an index access. For full-text indexes, there are no tables. The two join parties are two document sets from different keyword searches, and the join attributes are the document meta-data/attributes, which are stored and indexed within a full-text index, using methods described above.

For sake of explaining a first embodiment of the invention, it is assumed that there are two full-text indexes (outer and inner indexes) to be joined through equality condition on two attributes. For the above-described example, we have book full-text index for books collection (outer) and author index for authors collection (inner). The join condition is book:author=author:name, where author and name are two attributes of two indexes respectively. The whole query can be expressed as: book:contains(DB2)^book:author=author:name^author:contains(IBM). A join condition is also referred to herein as a join predicate, and the rest conditions of the full-text query are referred to herein as local predicates. The full-text nested-loop join process (FTNJ) evaluates both local and join predicates at the same time.

FIG. 1 shows pseudo code for the FTNJ process in accordance with an embodiment of the invention. The inputs of the process specify the outer and inner indexes, outer and inner predicates if any, and the two join attributes. In FIG. 1, line 10, the function FT_Search( ) evaluates a full-text query and returns a list of document ids.

The join condition is on attribute values. For example, the join in the above-described example is on attributes book:author and author:name. Note that to probe the full-text index on author collection, we need to have a value. So, we need to find the values of the join attribute, book:author in this case, so that we can use these values to probe the other index. In other words, we need a mechanism to obtain the values of join attributes using document ids from a full-text index directly. In this example, when the index is being built on the book collection, we also store the attribute author in the full-text index (using techniques described above). In this process, the function FT_GetAttribute( )(Line 12) returns the corresponding attribute value. Note that in order to evaluate the equality condition innerja=$v_o$, we should index each attribute value as a single value without being tokenized. Also, the full-text search should support searching the content under specified fields/attributes, as described above.

FIG. 2 shows a diagram of the components of a full-text nested loop join processor 10, also referred to herein as a join processor 10, in accordance with an embodiment of the invention. The join processor 10 includes a book index 11 and an author index 12. A field attribute store unit 14, stores the field attributes, such as author. Posting lists 16, 18 and 20, are also shown in FIG. 1. The book index 11 and the author index 12 also each include a term dictionary 22, 24.

FIG. 2 shows four main steps in the FTNL process, labeled 1 through 4. In step 1, at the beginning of the process, the local predicates in the outer index (book index 11) are evaluated by probing the outer collection. In the present example, this step would identify books in the book index 11 that are about DB2 and place these document ids in the posting list 16. Although, we used a single keyword in the example, in practice the local predicate could be an arbitrary full-text query. In step two, for each document id (e.g. $d_o$) from the result set of the outer local predicate, the process will now fetch the value of the author attribute as the join value. This join value for one of the documents in the example shown in FIG. 2 is the author name "Joe", which may be stored in the field/attribute store unit 14.

In step three, with the join value in hand, the process can now probe the inner full-text author index 12 and obtain the posting list 18 of the join value term. The process will then merge the posting list 18 with the resulting posting list 20 from the inner local query result. Posting list 20 represents documents related to the word "IBM". Note that if the inner local full-text query is a complex query (with conjunctions and disjunctions of many terms), the resulting posting list can be cached to avoid repeated evaluation of this local query. This merge will then find the authors, such as "Joe", who are associated with IBM.

In step four, $d_o$ is paired with the document ids generated from the merge of the posting lists from the join value and the inner local query. The result set is $\{(d_o, d_i)\}$, which, in this example, represents the set of books about DB2 whose authors are affiliated with IBM.

One assumption of this FTNL process is that the join values of an outer index are stored inside a full-text index, as described above, and the attribute values of an inner index are indexed, also as described above. Full-text join conditions are typically on meta-data such as attributes or fields. Since most search engines already have efficient support for indexing and retrieving document fields/attributes (like titles, dates, URLs, etc.), the join value lookups can be supported efficiently in a similar way.

A second embodiment of the invention includes a process for performing a full-text dictionary join (FTDJ). This FTDJ relies on the observation that the terms in a full-text dictionary are already in sorted order. This embodiment simultaneously scans (merge-join) the terms in the dictionaries of two full-text indexes, and efficiently identifies the document pairs that satisfy a join condition. It is assumes that values of both attributes are indexed in full-text indexes, as described above.

FIG. 3 shows the pseudo code for the FTDJ process in accordance with an embodiment of the invention. The inputs to this process are the same as those in the full-text nested-loop join, shown in FIG. 1. As shown in FIG. 3, the dictionaries of the two full-text indexes are intersected using function FT_DI( )(Line 10). FIG. 4 shows the pseudo code for this full-text dictionary intersection step FT_DI( ) In particular, the process in FIG. 4 performs a synchronized sequential scan over the dictionaries of the two full-text indexes. The function FT_Terms( )(FIG. 4 lines 8 and 9) returns the dictionary terms under the specified attribute in a full-text index. As the terms in the dictionaries are sorted, a single scan is sufficient. Also note that this merge join only applies to the terms that are restricted by the input attribute. In FIG. 4 line 16, for each common term value, we remember the matching terms by collecting them in a result list.

In the FTDJ process shown in FIG. 3, (lines 11-15), for each matching term pair, the document ids from the two corresponding posting lists, which also satisfy local full-text predicates, are paired as results. For ease of exposition, we conduct a merge of posting lists from term pairs and local predicates in a single FT_Search invocation (lines 12 and 13). In practice, the resulting posting list of a local predicate can be cached to avoid repeated evaluations.

Figure 5:
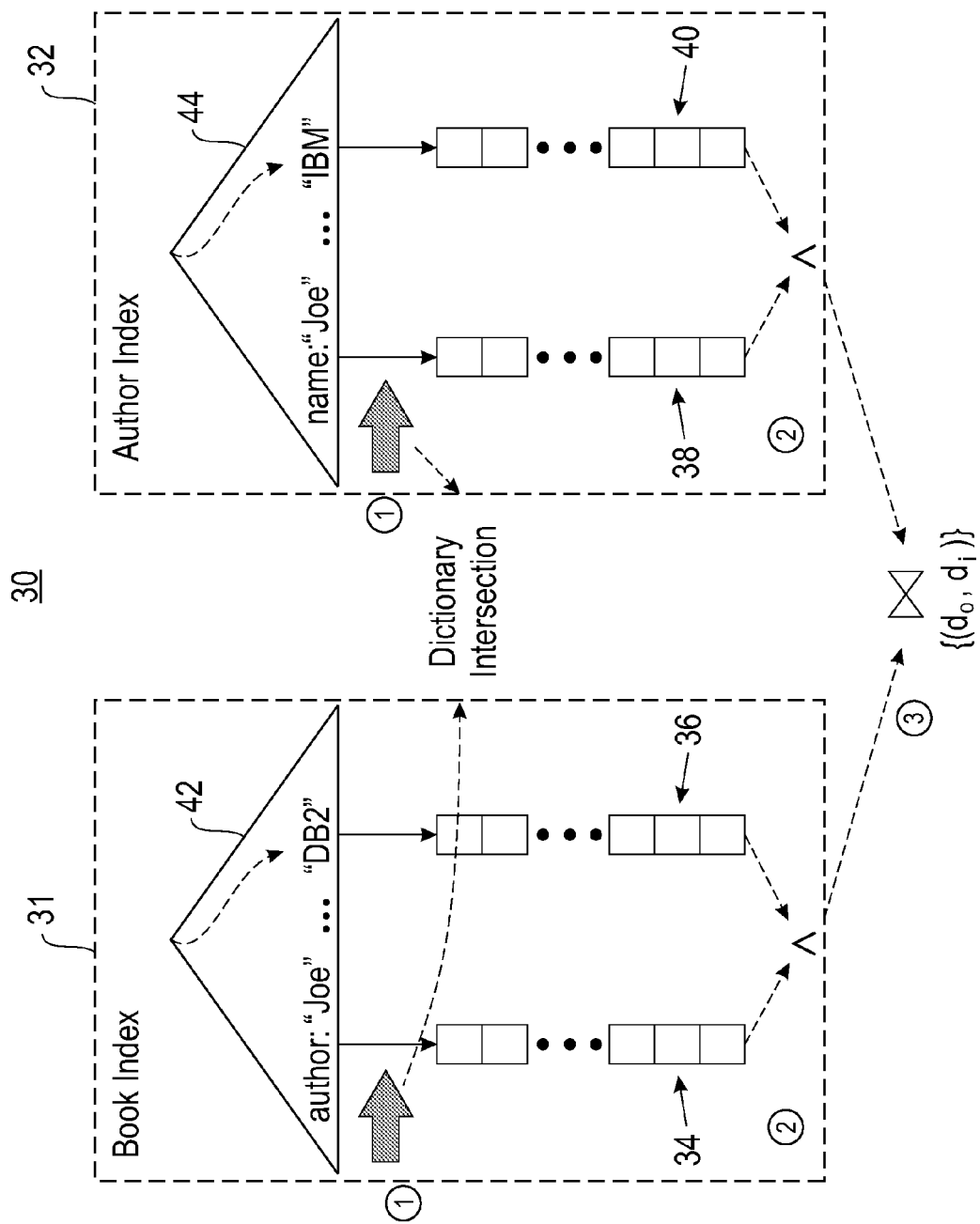
FIG. 5 shows a full-text dictionary intersection join processor in accordance with an embodiment of the invention.

FIG. 5 shows a full-text dictionary intersection join processor 30, also referred to as a join processor 30, in accordance with an embodiment of the invention. A book index 31 and an author index 32 are also shown. Posting lists 34, 36, 38, and 40 are also shown in FIG. 5. The book index 31 and the author index 32 also each include a term dictionary 42, 44.

FIG. 5 shows three main steps in the full-text dictionary intersection join, labeled 1 through 3. In the first step, the process starts the dictionary intersection, which is a merge join of the terms from the dictionaries of two indexes. Two terms form a matching pair if they are of the respective input attributes and have the same term value. In step 2, for a matching term pair, the posting list of each term is merged with the resulting posting list of the corresponding local predicate. If a local predicate is a complex query, the resulting posting list can be cached. In the third step, the resulting document ids from both indexes are paired as results, since the documents in each pair share the same term value and satisfy the local predicates on their corresponding indexes. After this, the process goes back to process the next matching term pair.

In the pseudo code shown in FIG. 3, at lines 12-13 the process repeatedly applies local predicates on each returned term. In cases when a local predicate is complex or has a long posting list, re-evaluating the predicate or scanning a long list again and again may be costly. Another alternative process to handle this situation is shown in FIG. 6. In particular, FIG. 6 shows the pseudo code for an alternative process for full-text dictionary join in accordance with an embodiment of the invention. In FIG. 6, the process first invokes the FTDJ process without any local predicates to obtain a set of join results. Then in line 10 and line 12, the process we sorts the results on either outer or inner doc ids and treats this sorted list as a virtual posting list. This virtual posting list is further filtered by local predicates (line 11 and line 13). If the result of the join predicate is small but local predicates are complex, or the results of local predicates are large, FTDJA has a better performance since it invokes local predicates only once. It is clear that FTDA and FTDJA are complementary to each other. We choose one of them depending on the selectivities of join and local predicates.

From the description above, it can be seen that the full-text dictionary join process can utilize the full-text indexes of both collections. Moreover, both collections are treated symmetrically. If the selectivities of local queries are inaccurate or unknown, this process provides a safer bet over the nested-loop join. Furthermore, since the terms in a dictionary are already sorted, this process takes advantage of this and performs the intersection without the sorting cost. For ease of presentation, we separated the function FT_DI( ) from the rest of the process. In other embodiments, these two processes are actually merged together, such that it is not necessary to materialize the full list of matching term pairs. Also, the pointer to a posting list of a term can be carried to FT_Search (FIG. 3, lines 12-13), hence, it is not necessary to look up this term again in the dictionary.

In a third embodiment of the invention, a process to perform full-text merge join is provided. Note that, as described above, we can store and retrieve attribute values efficiently. In Full-Text Merge Join (FTMJ), local predicates are evaluated on each index first. This produces two lists of results in the tuple format: (docid, value). Then, these two tuple lists are merged (joined) on value. FIG. 7 shows the pseudo code for the Full-Text Merge Join process in accordance with an embodiment of the invention. In FIG. 7, the function FT_AttrSearch( ) evaluates local predicates and returns the specified attribute value together with document ids.

For the above-described example, attributes author and name, and their values are stored using methods previously described. The FTMJ process evaluates the full-text search "DB2" ^ "author", and fetches the attribute values of author from payload or document store for the result documents. The result list can be represented as a (docid, author) list. The process evaluates a similar query on the author index, "name" ^ "IBM", and obtains a second list, (docid, name) list, of qualifying results with name values. Then, the process joins these two lists using the condition author=name, and generates the document id pairs. For this last step, both search result lists can be sorted on attribute values, and the sort-merge join can be used. Note that other join methods, such as hash join, can also be employed.

As described in the various embodiments of the invention, the full-text index nested-loop join and full-text dictionary join processes incorporate the processing of join and local full-text predicates over both input collections. In full-text indexes, join attribute values can be obtained efficiently, and we have more options for join processing, such as sort-merge join.

The above-described full-text join processes can be directly used to support queries across multiple full-text indexes on different data collections. These processes can also be used in a database system that combines full-text indexes. For example, we can rewrite a SQL or XQuery query, and push the generated full-text predicates including join predicates down to the full-text indexes. By processing join predicates inside full-text indexes, we provide a database system with additional filtering capabilities, the avoidance of repeated evaluation of local full-text predicates, and the reduction of the cross-engine communication overhead.

As can be seen from the above disclosure, embodiments of the invention provide techniques for full-text join processes. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
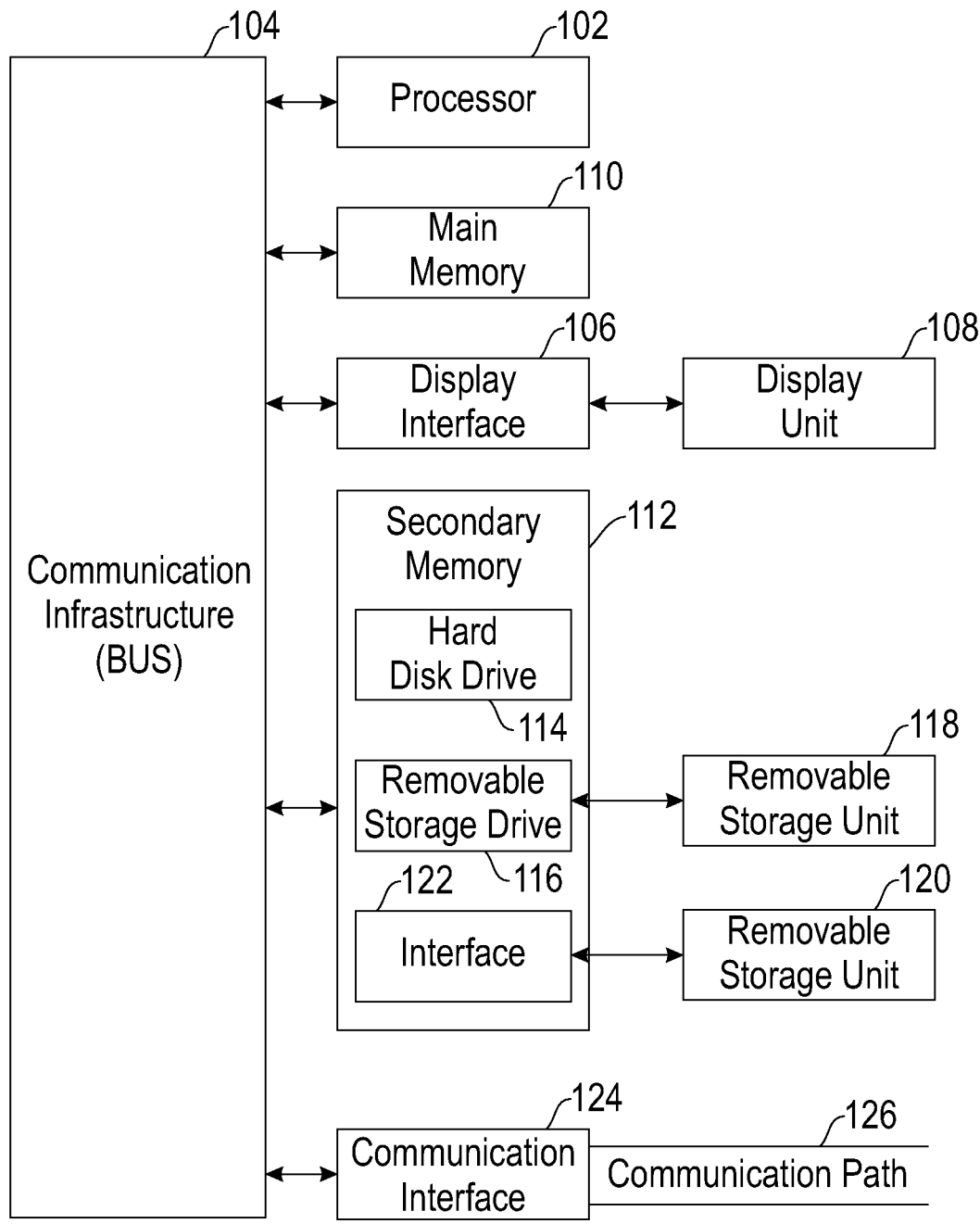
FIG. 8 shows a high level block diagram of an information processing system useful for implementing one embodiment of the present invention.

FIG. 8 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer hardware implemented method comprising:
   receiving a query by a processor, the query comprising:
      an inner full text index which comprises a first set of document ids, each of the documents ids having a first attribute and a first value;
      an outer full text index which comprises a second set of document ids, each of the documents ids having a second attribute and a second value;
      one or more inner local predicates comprising a first search term for the inner full text index;
      one or more outer local predicates comprising a second search term for the outer full text index,
      an inner join attribute comprising a third search term corresponding to the first value; and
      an outer join attribute comprising a fourth search term corresponding to the second value; and
   using said processor to:
      evaluate the one or more outer local predicates from said query of the outer full text index to generate a first posting list of documents;
      determine the second value of the outer join attribute from said query for each document in said first posting list;

probe the inner full text index to obtain a second posting list of documents containing one of said inner join attributes determined for each document in said first posting list;

evaluate the one or more inner local predicates of the inner full text index to generate a third posting list of documents;

merge said second posting list with said third posting list to generate a merge list of documents; and pair up each document in said first posting list with documents in said merge list.

2. The method according to claim 1 wherein said first, second and third posting lists contain lists of document identifiers.

3. The method according to claim 1 wherein said inner and outer full text indexes comprise lists of documents that result from different full-text searches.

4. The method according to claim 1 wherein at least one of said local predicates is a full-text query including single keywords.

5. The method according to claim 4 wherein at least one of said full text queries is a complex query and wherein said method further comprises caching said third posting list.

6. The method according to claim 1 wherein said join attribute is a join condition on meta-data.

* * * * *